US005873622A

United States Patent [19]

Klüting et al.

[11] Patent Number: 5,873,622

[45] Date of Patent: Feb. 23, 1999

[54] CONTINUOUSLY ADJUSTABLE POWER-ACTUATED DOOR LOCK FOR A MOTOR VEHICLE DOOR

[75] Inventors: Bernd-Alfred Klüting, Radevormwald; Friedrich G. Klingelhöfer, Remscheid, both of Germany

[73] Assignee: ED. Scharwächter GmbH & Co., KG, Remscheid, Germany

[21] Appl. No.: 729,131

[22] Filed: Oct. 11, 1996

[30] Foreign Application Priority Data

Oct. 11, 1995 [DE] Germany ........................ 195 37 816.4

[51] Int. Cl.[6] ........................ B60J 5/00

[52] U.S. Cl. ........................ 296/146.11; 296/146.4; 16/82; 16/337

[58] Field of Search ........................ 296/146.1, 146.4, 296/146.11, 202; 16/82, 337

[56] References Cited

U.S. PATENT DOCUMENTS 1,707,202 2/1929 Dudley ........................ 16/82
2,079,054 5/1937 Vadasz ........................ 16/82
2,874,960 2/1959 Durbin et al. ........................ 16/82
5,346,272 9/1994 Priest et al. ........................ 296/146.11

FOREIGN PATENT DOCUMENTS 2660008 9/1991 France ........................ 16/337

*Primary Examiner*—Dennis H. Pedder
*Attorney, Agent, or Firm*—Anderson, Kill & Olick, P.C.

[57] ABSTRACT

A continuously adjustable power-actuated door lock for a motor vehicle door attachable to a motor vehicle with at least two hinges, and including a locking device connected, with a door pillar and a door and having a braking element movable between a braking position, in which the door is locked, and a release position, and a drive for displacing the braking element between the braking and release positions and including an electric motor controllable in accordance with an actual open position of the door, a direction of door movement, an instantaneous speed of the door movement, and movement characteristics of the door including door weight, inner resistance of a door attachment, with the locking device being formed integrally with one of two door attaching hinges.

6 Claims, 4 Drawing Sheets

CONTINUOUSLY ADJUSTABLE POWER-ACTUATED DOOR LOCK FOR A MOTOR VEHICLE DOOR

BACKGROUND OF THE INVENTION OF THE INVENTION

1. Field of the Invention

The present invention relates to a continuously adjustable power-actuated door lock for a motor vehicle door attachable to a motor vehicle body with at least two hinges, and comprising locking means connected, on one hand, with one of a door pillar and a part associated with the door pillar, and connected, on the other hand, with one of a door and a part associated with the door, and including braking means movable between a braking position, in which the door is locked, and a release position, and drive means for displacing the braking means between the braking and release positions and comprising an electric motor controllable in accordance with an actual open position of the door, a direction of the door movement, an instantaneous speed of the door movement, and movement characteristics of the movable door such as weight, inner resistance of a door attachment, etc.

2. Description of the Prior Art

The prior art discloses different continuously adjustable door locks for motor vehicles doors the locking devices of which are operable in braking and release directions in accordance with an actual open position of the vehicle door, the movement direction of the door, an instantaneous speed of the door movement, and movement characteristics of the door such as door weight, inclination of a vehicle, inner resistance of the door attachment, and, sometimes, a force applied to open the door. However, all of the known constructions of such locking devices are formed, more or less, as a separate unit to be mounted inside the vehicle door. The known constructions of the locking devices require the use of a door stay bar and an arrangement for connecting the door stay bar with the locking device, which significantly increases the costs of the door locks with such locking devices. An additional drawback of mounting of a locking device inside the vehicle door consists in that the available mounting space inside the vehicle door, which is already occupied with such vehicle accessories as mirror adjusting device, door lock, window lifter, loudspeaker, etc. . . . is further reduced which, if only because of space considerations, leads to a substantial increase in the costs of production of a locking device. Besides, mounting of a locking device in the interior of a vehicle door is relatively labor-consuming, which additionally increases the costs of using such locking devices.

Accordingly, an object of the present invention is to provide a continuously adjustable power-actuated door lock for a motor vehicle door which, without losing its effectiveness, would have reduced manufacturing and mounting costs.

Another object of the present invention is to provide a compact locking device of the above-described type which would occupy relatively little space.

A further object of the present invention is to provide a locking device of the above-described type which can be mounted simultaneously with attachment of a vehicle door to a motor vehicle.

SUMMARY OF THE INVENTION

These and other objects of the present invention, which will become apparent hereinafter, are achieved, according to the present invention, by forming the locking device integrally with one of the two door hinges used for attaching a door to a motor vehicle. Forming a door locking device integrally with a door hinge, on one hand, substantially facilitates the mounting of the door lock and, on the other hand, provides for optimal use of a free space available between the door and the door pillar. In particular, when the door is provided with a torsional door lock formed integrally with the door hinge, the space available between the door an the door pillar is generally sufficient for locating the continuously adjustable power-actuated locking device therein, provided the locking device is sufficiently small. With regard to the shape of the door, door pillar and the door lock, the present invention leaves the designer of the door lock or the door hinge sufficient freedom in shaping the door lock or the door hinge.

To insure compactness of the continuously adjustable power-actuated door lock, which is formed integrally with the door hinge, according to the invention, it is contemplated to provide the braking means, which form a part of the locking device and rotational movement of which depends on the door movement, and with a rotatable part the rotational axis of which extends parallel to and, preferably, is coaxial with the hinge axis, and with a braking or retaining element cooperating with the rotatable part and adjustable in a direction of its action by a power-applied drive or adjusting element.

According to the present invention, it is further contemplated to provide a driving connection of the brake rotatable part with the door flap of the door hinge, or directly connect the rotatable part with the door flap. At that, the rotatable part can be formed as a swinging arm having one end thereof fixedly connected with door flap by a carrier pin or a coupler, and having the other end thereof rotatably supported on the hinge pin or an extension of the hinge pin. Advantageously, the rotatable part is formed as a rotationally symmetrical part, in particular, as a disc or a drum which is connected by the coupler or the carrier pin with the door flap at a region of its circumference, and the central region of which is supported on the hinge pin. The braking or retaining element, which cooperates with the rotatable part, is generally supported against the door pillar and is actuated in a braking or release direction by an electric motor drive the operation of which is controlled by an appropriate control means.

There exists a number of different ways to form the rotatable part and the braking element. The particular structures of the rotatable part and the braking element are selected in accordance with particular requirements and use conditions such as available mounting space, and required braking or retaining force. Specifically, the rotatable part can be formed as a shaft stub or pulley, with the braking element being formed, e.g., as a braking band.

The rotatable part can also be formed as a roller or a braking drum, with the braking or retaining element being formed as a brake shoe.

According to another embodiment of the invention, the rotatable part can be formed as a brake disc, with the braking or retaining element being formed as a clasp brake.

The rotatable part can also be formed as a rotatable overrunning clutch. At that, one half of the clutch can be mounted on the hinge pin for joint rotation therewith, with the other half being formed as a part displaceable in accordance with an opening angle of a vehicle door and connected with a hinge flap. The overrunning clutch further includes a free running body the displacement of which is adjusted by an electric motor drive.

According to yet another embodiment of the invention, the rotatable part can be formed as a spindle, the axis of which is parallel to or, preferably, coaxial with the axis of the hinge pin, with the braking element being formed as a clasp nut.

According to a further development of the present invention there is provided a transmission between a door lock member, which is connected with a hinge flap, and the rotatable part of the braking means. According to the invention, the transmission is preferably formed as a planetary gear the ring gear of which forms the member connected with the hinge flap, and the associated planetary carrier is connected with the hinge pin for joint rotation therewith.

The electric motor drive which effects the displacement of the locking and braking device in accordance with parameters of the door movement, in a simplest form, can be formed as a linear electric motor, in particular, as an electromagnet which would insure easy braking of the door when the door reaches its stop point in its total opening path. However, preferably, the electric motor should be formed as a rotary electric motor.

BRIEF DESCRIPTION OF THE DRAWINGS

The features and objects of the present invention will be more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
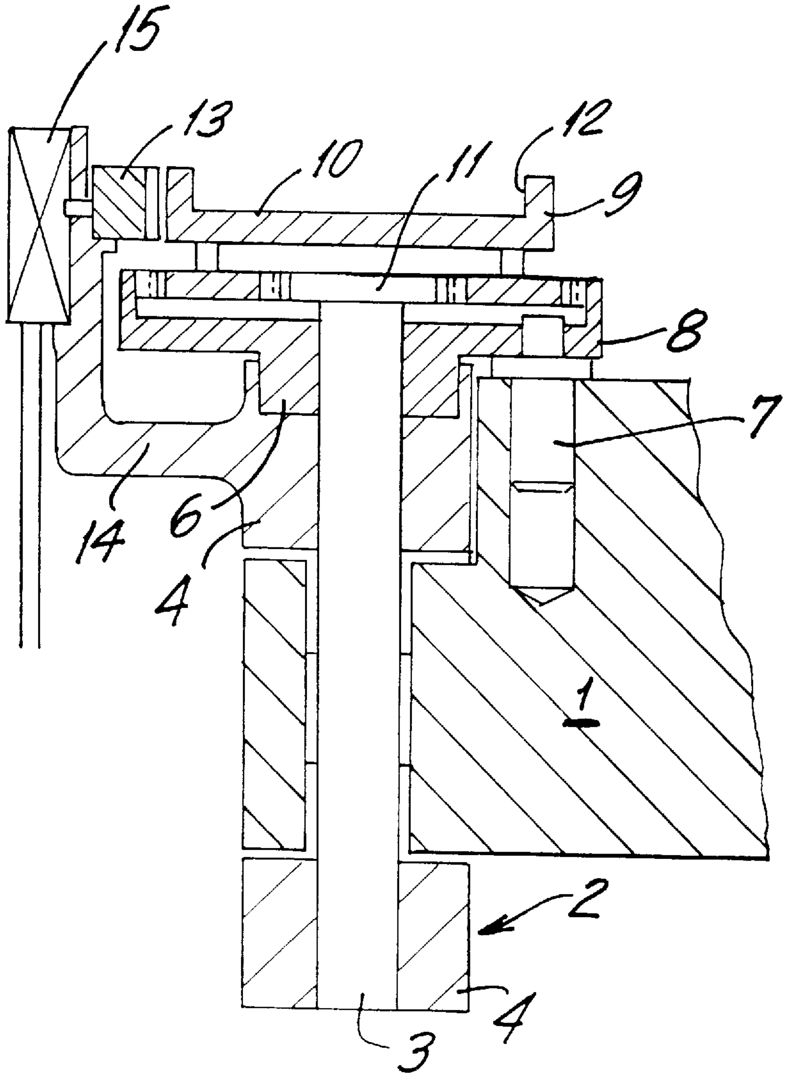
FIG. 1 is a schematic cross-sectional side view of a first embodiment of a power-actuated continuously adjustable door lock, which forms an integral part of a door hinge, according to the present invention.

The drawings show a power-actuated continuously adjustable door lock according to the present invention, which forms an integral part of a door hinge formed as a flap hinge. One half or flap 1 of the door hinge is attached to a vehicle door with means not shown in detail, and another flap 2 of the door hinge is attached to a door pillar with means likewise not shown in detail. The two flaps 1 and 2 are pivotally connected with each other by a hinge pin 3 which defines a hinge axis. The hinge pin 3 is fixedly secured, without a possibility of rotation, in outer lugs 4 of the door pillar flap 2 and extends through the hinge lug 5 of the door flap 1 with a running fit. The hinge pin 3 is supported in the lug 5 with bearing sleeves.

Figure 2:
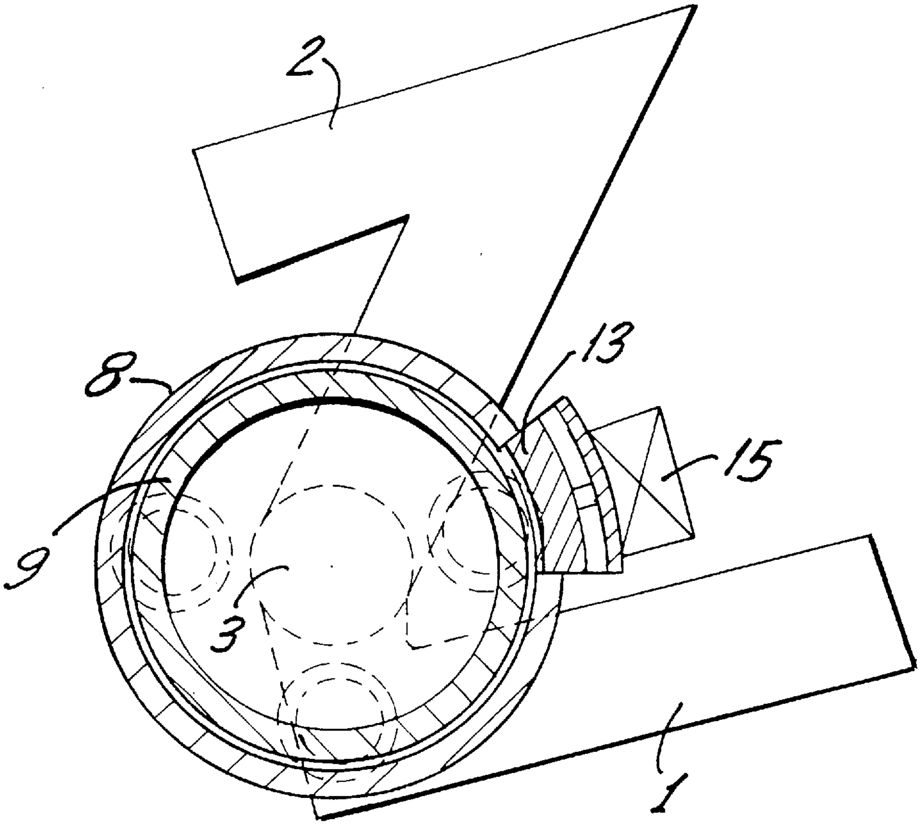
FIG. 2 is a plan view of the door lock shown in FIG. 1.

In the embodiment shown in FIGS. 1 and 2, a driven member 8, the rotation of which is determined by door movement, is rotatably supported with its hub 6 on a portion of the hinge pin 3 which projects above the upper hinge lug 4 of the door pillar flap 2. The member 8 is fixedly connected with the door flap 1 by a carrier pin 7. A transmission, which is formed as a planetary gear, connects the member 8 with a rotatable part 9 of a braking and retaining device. AT that, the member 8 is formed by a ring gear of the planetary gear and serves as a locking part . The sun wheel 11 of the planetary gear is connected with the hinge pin 3 without a possibility of rotation relative thereto, and the planetary carrier 10 is connected to the brake drum 12 of the braking and retaining device for joint rotation therewith, the brake drum 12 forming the rotatable part of the braking and retaining device, which is connected with the member 8. The braking and retaining device includes a brake shoe 13. The brake shoe 13 is adjustably supported on a carrier 14 which is fixedly connected with the door pillar flap 2. The brake shoe 13 is displaceable radially relative to the brake drum 12 between a braking position, in which the brake shoe 13 engages the brake 12, and a release position in which the braking shoe 13 is spaced from the brake drum 12. The displacement of the braking shoe 13 is effected by an electromotor 15 and is controlled by an electronic control unit dependent on movement characteristics of the vehicle door.

Figure 3:
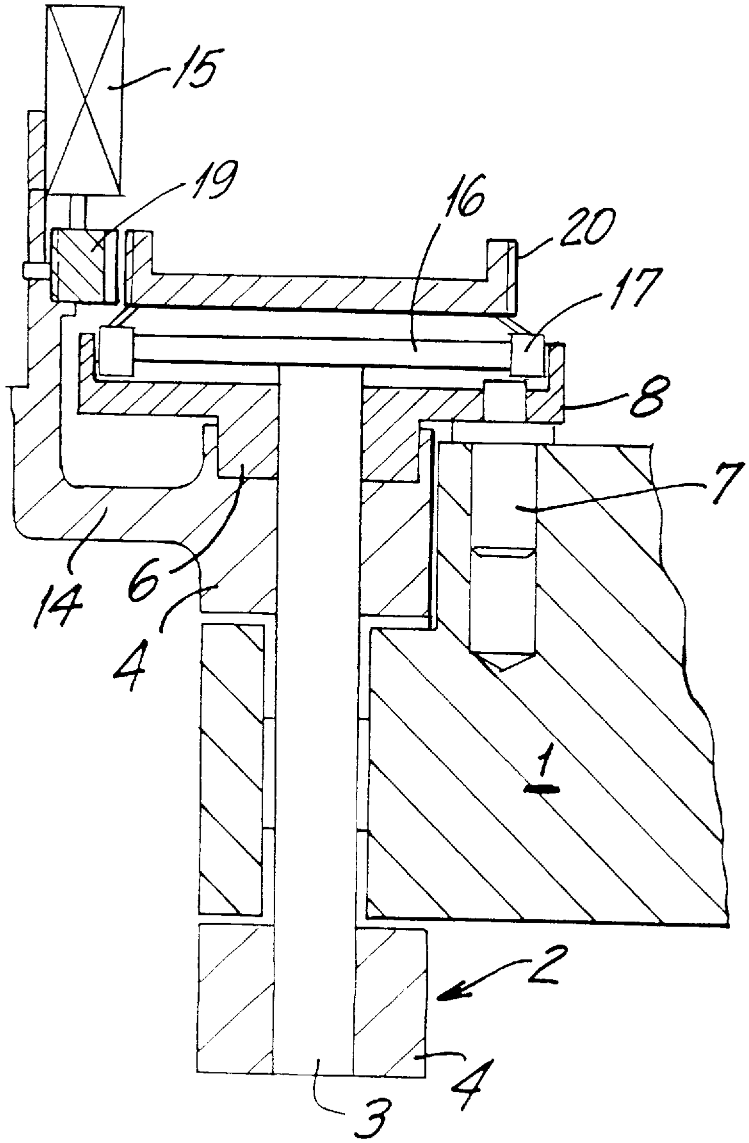
FIG. 3 is a schematic cross-sectional side view of a second embodiment of a power-actuated continuously adjustable door lock, which forms an integral part of a door hinge, according to the present invention.

In the embodiment of the inventive door lock shown in FIG. 3, the member 8, which is likewise driven in accordance with door movement, is also supported with its hub 6 on the portion of the hinge pin 3 projecting above the upper lug 4, and is fixedly connected with the door flap 1 by a carrier pin. The member 8 is somewhat pot-shaped and forms a half of an overrunning clutch, the other half of which is formed by a disc 16 fixedly connected with the hinge pin 3. A freely rotatable body 17 is located between the inner circumference of the pot-shaped member 8 and the disc 16. A driving gear, which is driven by the electromotor 15 and the operation of which is controlled by an electronic control unit in accordance with the movement characteristics of the door, is fixedly supported on the door pillar flap 1 by a carrier 14. The electromotor 15 is drivingly connected with a pinion 19 which cooperates with a set collar 20 for adjusting the position of the freely rotatable body 17.

Figure 4:
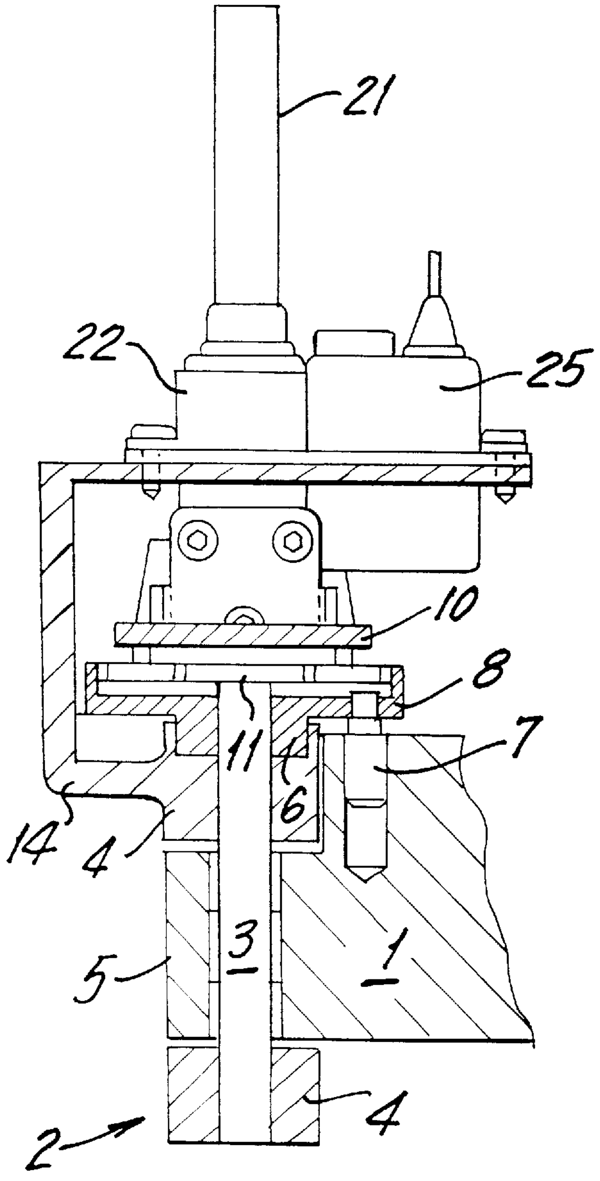
FIG. 4 is a schematic cross-sectional side view of a third embodiment of a power-actuated continuously adjustable door lock, which forms an integral part of a door hinge, according to the present invention.

In the embodiment shown in FIG. 4, the member 8 is likewise supported with its hub 6 on the portion of the hinge pin 3, which projects above the upper lug of the door pillar hinge flap 2, and is connected with the door flap 1 by the carrier pin 7. As in the embodiment shown in FIGS. 1–2, a transmission, which is formed as a planetary gear, connects the member 8 with a rotatable part of the braking and retaining device. The member 8, as discussed with reference to FIGS. 1–2, is formed by a ring gear of the planetary gear. The sun wheel 11 of the planetary gear is connected with the hinge pin 3 without a possibility of rotation relative thereto, and the planetary carrier 10 is connected with a spindle 21 which forms the rotatable part of the brake and retaining device. The braking and retaining device further includes a clasp nut 22, which is supported on a carrier 14 fixedly connected with the door pillar flap 2. The clasp nut 22 is movable into a braking engagement with the carrier 14. For braking the clasp nut 22 against the carrier 14, there is provided a band brake operable by an electric motor 15 and the operation of which is controlled by an electronic control unit in accordance with the movement characteristics of the vehicle door. The band brake controls the movement of the clasp nut 22 between braking and release positions.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claim is:

1. A continuously adjustable power-actuated door lock for a motor vehicle door attachable to a motor vehicle body with at least two hinges, the door lock comprising:

braking means for arresting door movement and including a rotatable part coaxial with a hinge axis of one of the at least two door attaching hinges and connected with one of the door and a part associated with the door, the rotatable part being rotatable in accordance with the door movement, and a braking member cooperating with the rotatable part for arresting the door movement; and an electric motor for displacing the braking member between a braking position in which the braking member engages the rotatable part for arresting the door movement, and a release position in which the braking member is disengaged from the rotatable part, enabling a free movement of the door.

2. A door lock as set in claim 1, wherein the rotatable part is connected with a door flap of the one door hinge.

3. A door lock as set forth in claim 1, wherein the rotatable part is supported by a hinge pin of the one door hinge.

4. A door lock as set forth in claim 2, wherein the braking member is supported on a one of the door pillar and a part associated with the door pillar.

5. A door lock as set forth in claim 1, comprising a transmission located between a locking part connected with a door hinge half of the one hinge and the rotatable part of the braking means.

6. A door lock as set forth in claim 5, wherein the transmission is formed as a planetary gear, in which the locking part is formed by a ring gear of the planetary gear, wherein a planetary carrier forms part of the rotatable part of the braking means, and a sun wheel of the planetary gear is connected with the hinge pin without a possibility of rotation relative thereto.

* * * * *